Dec. 11, 1923.
W. N. RETTINGER
1,477,150
WRINGER OPERATING MECHANISM
Filed Feb. 6, 1923
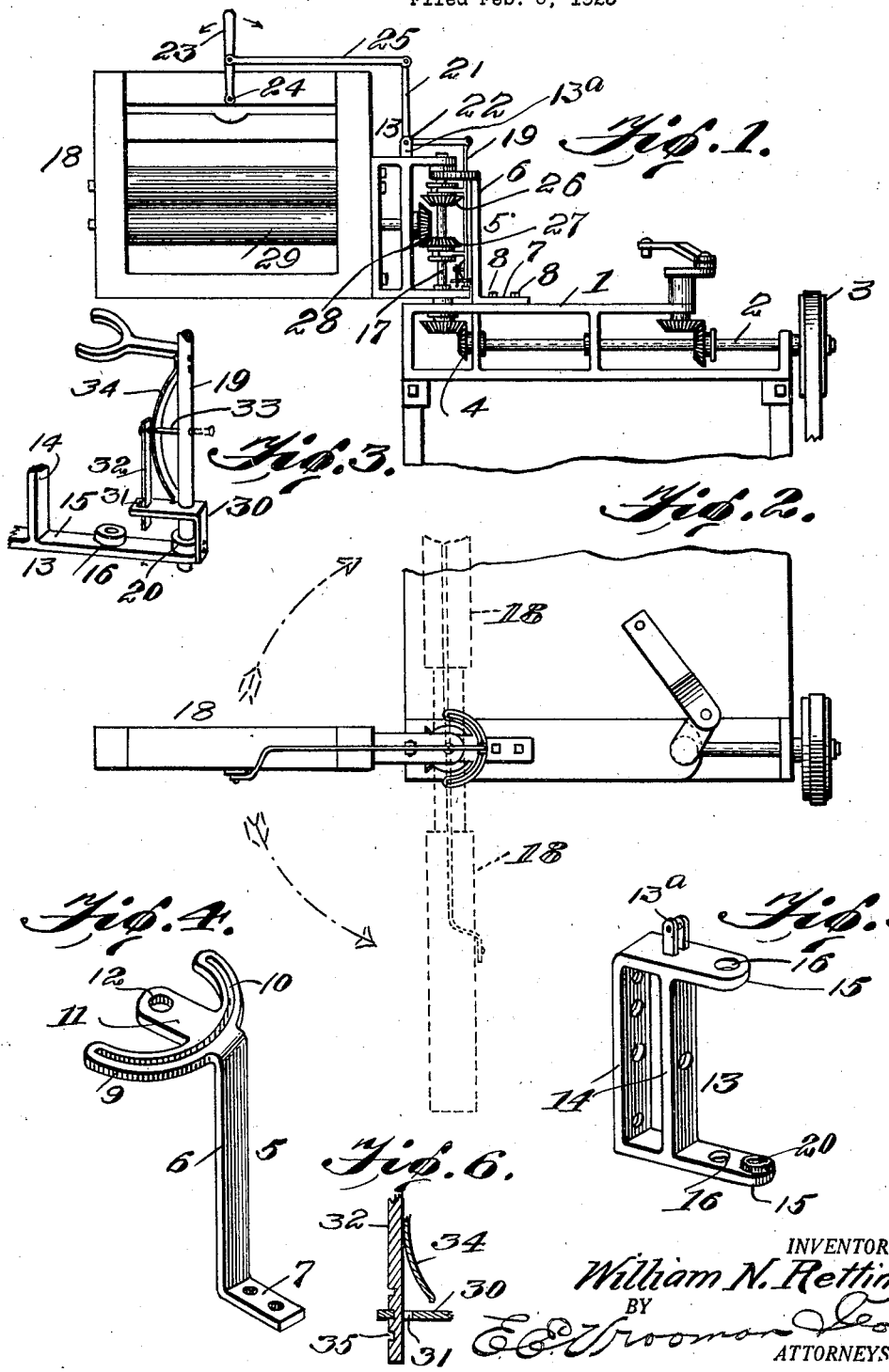
INVENTOR.
William N. Rettinger
BY
ATTORNEYS Patented Dec. 11, 1923.

1,477,150

UNITED STATES PATENT OFFICE.

WILLIAM N. RETTINGER, OF BOURBON, INDIANA.

WRINGER-OPERATING MECHANISM.

Application filed February 6, 1923. Serial No. 617,335.

*To all whom it may concern:*

Be it known that I, WILLIAM N. RETTINGER, citizen of the United States, residing at Bourbon, in the county of Marshall and State of Indiana, have invented certain new and useful Improvements in Wringer-Operating Mechanism, of which the following is a specification, reference being had therein to the accompanying drawings.

This invention relates to a wringer operating mechanism and the object of the invention is the construction of simple and efficient means for mounting a wringer, whereby it can be swung to different positions and at the same time efficiently operate the rollers of the wringer.

Another object of the invention is the construction of a wringer supporting mechanism, including a peculiarly constructed bracket, whereby the wringer is allowed to swing to different positions and means for efficiently shifting the gears for controlling the operation of the rollers of the wringer, irrespective as to the particular position of the wringer upon its support.

With the foregoing and other objects in view, my invention comprises certain novel combinations, constructions and arrangements of parts as will be hereinafter described, illustrated in the accompanying drawings, and more particularly pointed out in the appended claims.

In the drawing:

Figure 1 is a view, in elevation, of a wringer operating mechanism constructed in accordance with the present invention, while Figure 2 is a top plan view of the same.

Figure 3 is a fragmentary, enlarged, view of the gear shifting means of my mechanism.

Figure 4 is a perspective view of the primary bracket.

Figure 5 is a perspective view of the auxiliary bracket.

Figure 6 is a fragmentary, sectional view of the gear-shifting means.

Referring to the drawings by numerals, 1 designates the frame in which the primary driving shaft 2 is journalled. A belt wheel 3 is fastened to shaft 2, and wheel 3 may be driven by any suitable power. On the inner end of shaft 2 is a beveled gear 4. A primary bracket 5 is mounted upon frame 1, and said bracket comprises a vertical body portion 6 having a flat base 7, through which extends bolts 8 for securing the bracket on the top of frame 1. Integral with the upper end of bracket 5 is a grooved flange 9 in which is formed an elongated slot 10. Extending from the flange 9, and integral with its central portion is flange 11 having an aperture 12.

The auxiliary bracket 13 comprises two parallel bars 14, constituting a body, of the bracket, and extending from the body are arms 15; these arms 15 are provided with registering apertures 16. The auxiliary, vertical shaft 17 extends through the apertures 16 in arms 15 and also through aperture 12 of flange 11, Fig. 1, whereby wringer 18, fastened to bracket 13, will be pivotally mounted, to swing, upon frame 1.

A rod 19 is seated, at its lower end, in collar 20 and its upper end projects through slot 10 of flange 9. A bell crank lever 21 is pivoted, at 22, upon bracket 13ª. A hand grip 23 is pivoted, at 24, upon wringer 18, and link 25 connects lever 21 and grip 23, whereby, by swinging grip 23 upon its pivot 24, shaft 19 will be raised and lowered, in slot 10, sufficiently to shift gears 26 and 27; gears 26 and 27 are suitably mounted to slide on shaft 17 with respect to the gear 28. Gear 28 is suitably connected to roller 29 of the wringer 18.

The rod 19 is provided with locking means for holding it in an adjusted position and such locking means comprises angle bracket 30 attached to the outer end of the lower arm 15, of auxiliary bracket 13. This bracket 30 is provided with an elongated aperture 31, through which extends the rack bar 32. Rack bar 32 is mounted upon sliding pin 33, which pin 33 extends through bowed spring 34. Spring 34 bears outwardly upon rack bar 32 to cause it to have one of its notches 35 seated over the outer end of the bracket 30, whereby rod 19 is held in a given position, until the operator presses inwardly on rack bar 32, to cause the notched part of the bar to be disengaged from the bracket 30, then the shaft 19 may be moved, by operating grip 23, to the desired position for causing one of the gears 26 or 27 to engage gear 28, whereby when the operator releases the inward pressure on spring 34, thereupon the spring will force the rack bar 32 outward to cause one of the notches to be engaged by the bracket 30, holding the gear 26 in mesh with the gear 28.

While I have described the preferred embodiment of my invention, and have illustrated the same in the accompanying drawings, certain minor changes or alterations may appear to one skilled in the art to which this invention relates, during the extensive manufacture of the same and I, therefore, reserve the right to make such alterations or changes as shall fairly fall within the scope of the appended claims.

What I claim is:

1. In a mechanism of the class described, the combination with a frame, of a primary bracket above said frame, said bracket comprising a vertical body portion having a horizontal base, means fastening the base to said frame, said vertical body portion provided at its upper end with a curved flange and with a second flange extending from the middle of the first-mentioned flange, said curved flange provided with an elongated slot, a pivotally mounted auxiliary bracket associated with said primary bracket, a shaft provided with sliding gears extending through said primary and auxiliary brackets, means working in the slot of the primary bracket for shifting said gears, a wringer carried by the auxiliary bracket, and said wringer provided with a gear adapted to mesh with either one of the gears on the shaft.

2. In a mechanism of the class described, the combination with a frame, of a primary bracket provided with an elongated slot attached to said frame, an auxiliary bracket provided with a wringer pivotally mounted upon said frame and pivotally associated with said primary bracket, said wringer provided with rollers, driving means extending through said brackets and connected with said rollers for operating the same, and means for controlling the driving means extending through the slot in said primary bracket.

3. In a mechanism of the class described, the combination with a frame, of a wringer carried by said frame, said wringer provided with a gear, a pair of driving gears supported by the frame and cooperating with the gears of the wringer, a shifting device for said driving gears comprising a shaft, lever means for operating said shaft, a bracket, a rack bar slidably mounted upon said bracket, and yieldable means connecting said rack bar and shaft whereby when the rack bar is in a locked position upon the bracket accidental movement of the shaft will be prevented.

4. A gear locking device for a washing machine comprising a movable shaft, means on said shaft for connecting the same to sliding gears, a bracket provided with an elongated opening, a rack bar provided with notches slidably mounted in said opening, a pin slidably mounted on said shaft and extending through said rack bar, and a bowed spring on said pin between said shaft and rack bar.

In testimony whereof I hereunto affix my signature.

WILLIAM N. RETTINGER.